(12) United States Patent
Kim et al.

(10) Patent No.: US 10,219,001 B2
(45) Date of Patent: Feb. 26, 2019

(54) INTER-LAYER PREDICTION METHOD FOR MULTI-LAYER VIDEO AND DEVICE THEREFOR

(71) Applicant: Intellectual Discovery Co., Ltd., Seoul (KR)

(72) Inventors: Kyeong Hye Kim, Uijeongbu-si (KR); Hyun Ho Jo, Seoul (KR); Jung Hak Nam, Seoul (KR); Dong Gyu Sim, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 15/933,441

(22) Filed: Mar. 23, 2018

(65) Prior Publication Data

US 2018/0213252 A1 Jul. 26, 2018

Related U.S. Application Data

(63) Continuation of application No. 14/434,534, filed as application No. PCT/KR2012/011619 on Dec. 27, 2012, now Pat. No. 9,961,363.

(30) Foreign Application Priority Data

Oct. 9, 2012 (KR) .................. 10-2012-0111928

(51) Int. Cl.
*H04N 19/33* (2014.01)
*H04N 19/61* (2014.01)
(Continued)

(52) U.S. Cl.
CPC ......... *H04N 19/577* (2014.11); *H04N 19/109* (2014.11); *H04N 19/157* (2014.11);
(Continued)

(58) Field of Classification Search
CPC .......... H04N 7/12; H04N 19/30; H04N 19/33; H04N 19/34; H04N 19/61
See application file for complete search history.

(56) References Cited

U.S. PATENT DOCUMENTS 9,167,258 B2 10/2015 Kim et al.
9,282,343 B2 3/2016 Leontaris et al.
(Continued)

FOREIGN PATENT DOCUMENTS

CN 1220804 A 6/1999
CN 1355995 A 6/2002
(Continued)

OTHER PUBLICATIONS

H. Schwarz, et al., "Overview of the Scalable Video Coding Extension of the H.264/AVC Standard," *IEEE Transactions on Circuits and Systems for Video Technology*, vol. 17, No. 9, Sep. 2007, pp. 1103-1120.
(Continued)

*Primary Examiner* — Kate H Luo
*Assistant Examiner* — Patricia I Young
(74) *Attorney, Agent, or Firm* — NSIP Law

(57) ABSTRACT

An inter-layer prediction method and device for a multi-layer video. The inter-layer prediction method includes the steps of: generating a restored picture in a reference layer through the predictive coding of the reference layer, determining when there is a restored picture in the reference layer for the time corresponding to a current picture in an enhancement layer for coding or decoding of the current picture in the enhancement layer, and performing inter-layer prediction by referencing a picture in the enhancement layer or a restored picture in the reference layer, depending on whether there is restored picture from the same view in the reference layer.

2 Claims, 5 Drawing Sheets

(51) Int. Cl.
*H04N 19/30* (2014.01)
*H04N 19/34* (2014.01)
*H04N 7/12* (2006.01)
*H04N 19/577* (2014.01)
*H04N 19/503* (2014.01)
*H04N 19/109* (2014.01)
*H04N 19/157* (2014.01)
*H04N 19/187* (2014.01)
*H04N 7/00* (2011.01)
*H04N 19/70* (2014.01)

(52) U.S. Cl.
CPC .......... *H04N 19/187* (2014.11); *H04N 19/30* (2014.11); *H04N 19/503* (2014.11); *H04N 7/00* (2013.01); *H04N 19/61* (2014.11); *H04N 19/70* (2014.11)

(56) References Cited

U.S. PATENT DOCUMENTS

2013/0188690 A1  7/2013  Kim et al.
2014/0348232 A1  11/2014  Leontaris et al.

FOREIGN PATENT DOCUMENTS

| CN | 1926873 A | 3/2007 |
|---|---|---|
| CN | 101461244 A | 6/2009 |
| JP | 10-336669 A | 12/1998 |
| JP | 2003-515987 A | 5/2003 |
| JP | 2007-525924 A | 9/2007 |
| JP | 4294630 B2 | 7/2009 |
| KR | 10-0664929 B1 | 1/2007 |
| KR | 10-2011-0066523 A | 6/2011 |
| KR | 10-2012-0028843 A | 3/2012 |
| KR | 10-1349837 B1 | 1/2014 |

OTHER PUBLICATIONS

D. Hong, et al., "Scalability Support in HEVC," *6th Meeting of the Joint Collaborative Team on Video Coding (JCT-VC) of ITU-T SG16 WP3 and ISO/IEC JTC1/CS29/WG11*, Torino, IT, Jul. 14-22, 2011, pp. 1-15.

H. Choi, et al., "Scalable structures and inter-layer predictions for HVEC scalable extension," *6th Meeting of the Joint Collaborative Team on Video Coding (JCT-VC) of ITU-T SG16 WP3 and ISO/IEC JTC1/CS29/WG11*, Torino, IT, Jul. 14-22, 2011, pp. 1-15.

H. Schwartz, et al., "Constrained Inter-Layer Prediction for Single-Loop Decoding in Spatial Scalability," Proceeding from the IEEE International Conference on Image Processing, (ICIP 2005), held on Sep. 11-14, 2005, pp. II-870-3 (5 pages, in English).

International Search Report dated Jun. 25, 2013, in counterpart International Application No. PCT/KR2012/011619 (3 pages in English, 3 pages in Korean).

[Fig. 1]
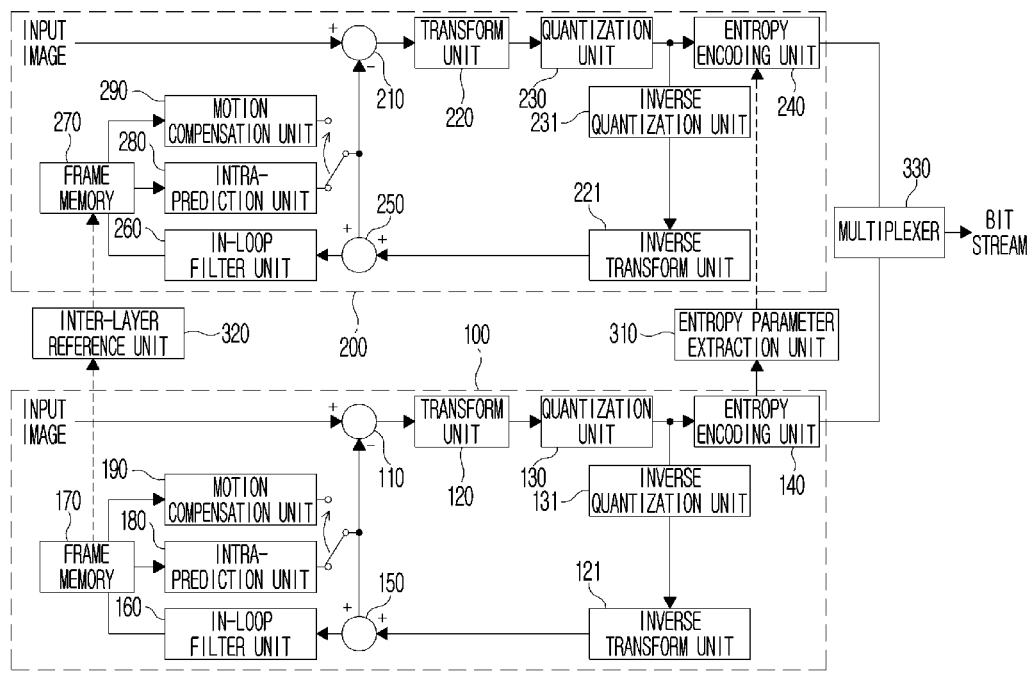
[Fig. 2]
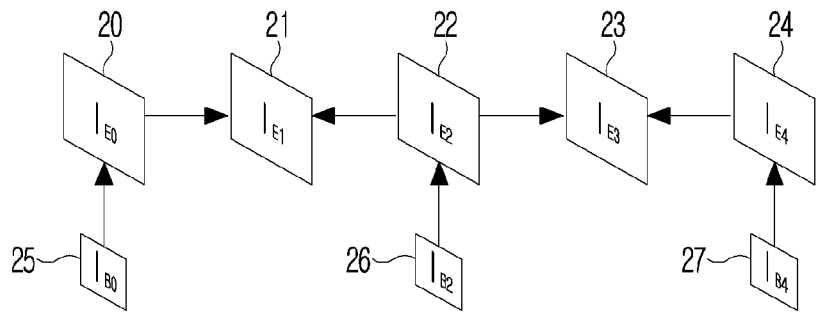

[Fig. 3]
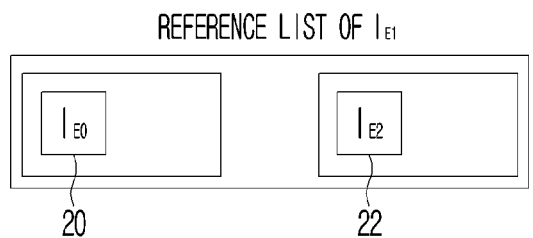
[Fig. 4]
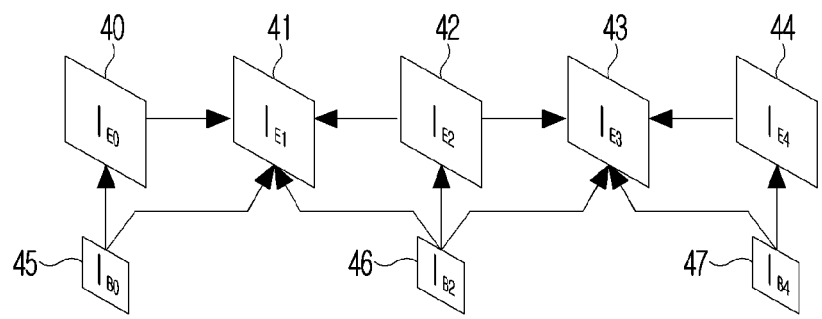
[Fig. 5]
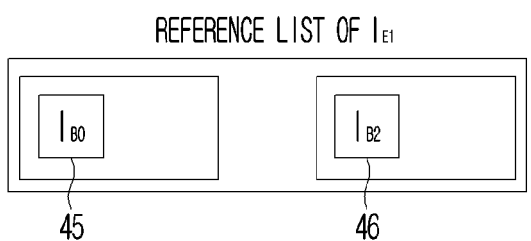

[Fig. 6]
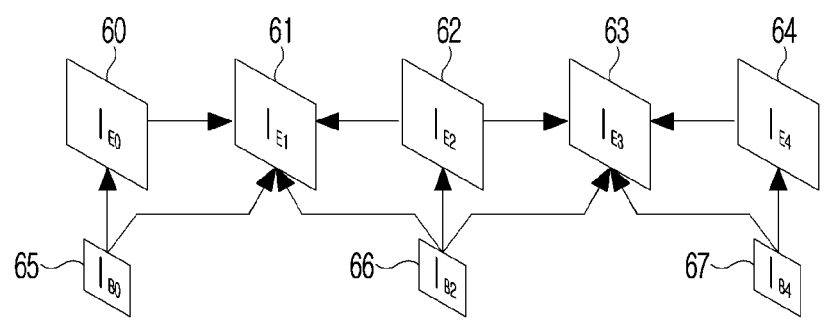
[Fig. 7]
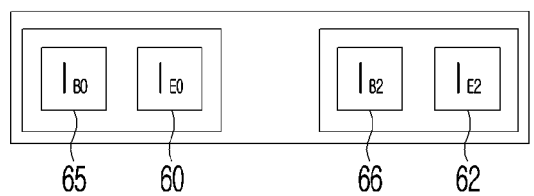

[Fig. 8]
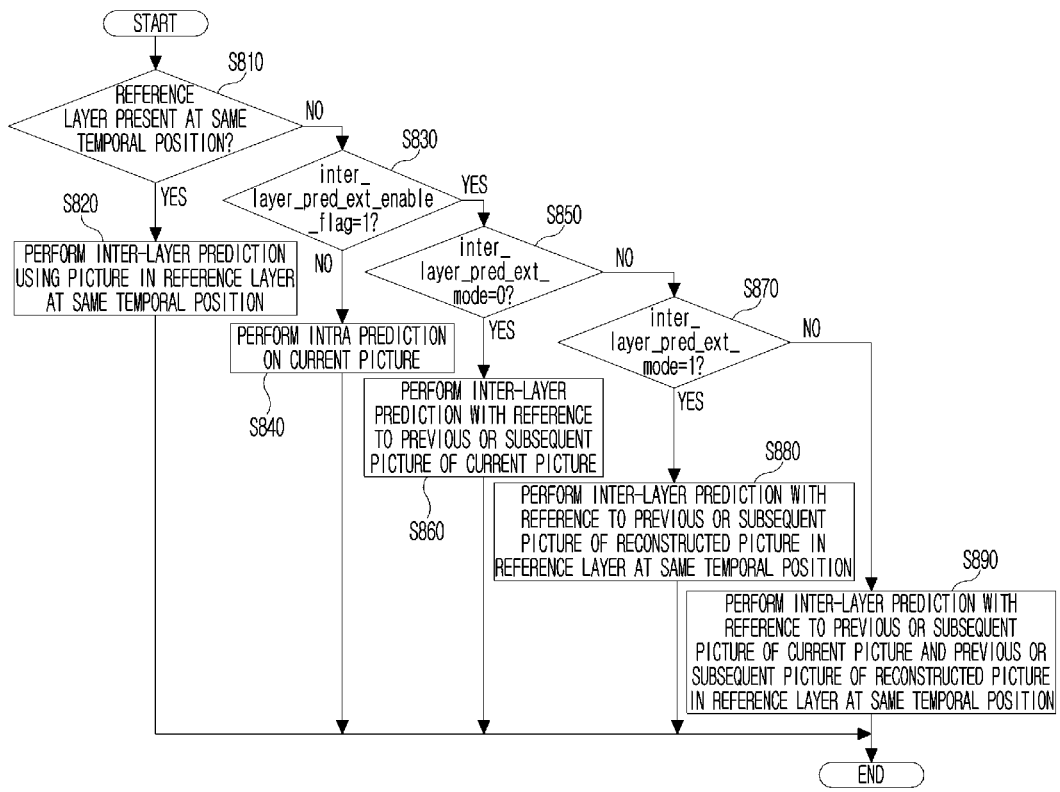
[Fig. 9]
| seq_parameter_set_svc_extension(){ | Descriptor |
|---|---|
| inter_layer_pred_ext_enable_flag | u(1) |
| if(inter_layer_pred_ext_enable_flag ==1){ | |
| inter_layer_pred_ext_mode | u(2) |
| } | |
| } | |

[Fig. 10]
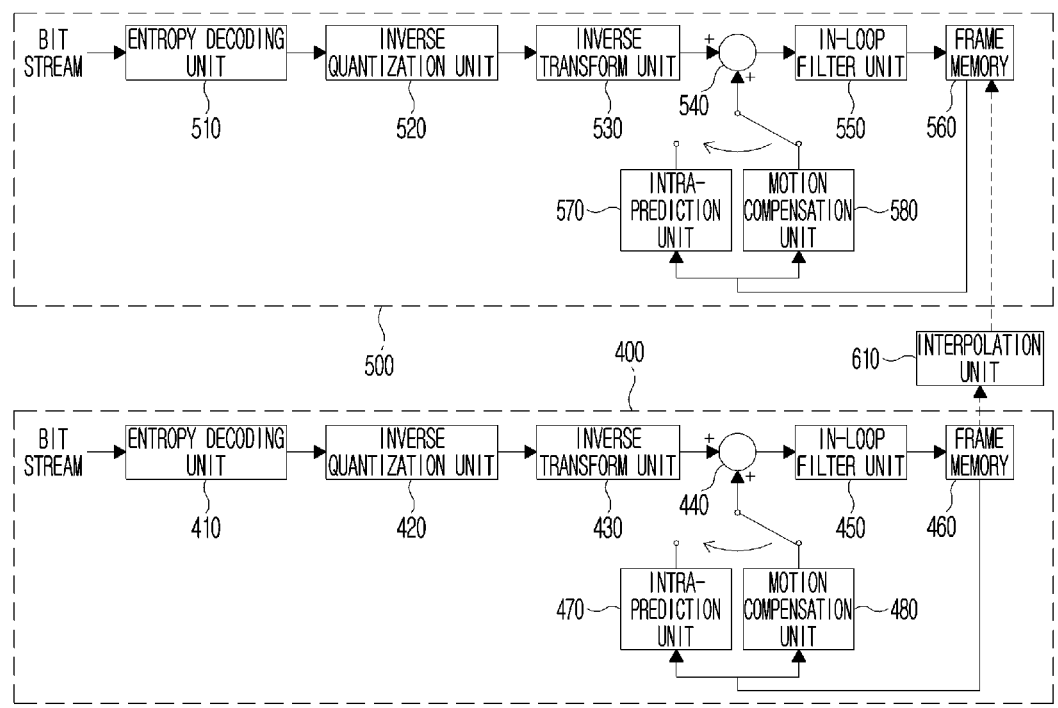

INTER-LAYER PREDICTION METHOD FOR MULTI-LAYER VIDEO AND DEVICE THEREFOR

CROSS-REFERENCE TO RELATED APPLICATIONS

This application is a continuation of U.S. Ser. No. 14/434,534 having a 371(c) date of Apr. 9, 2015, now U.S. Pat. No. 9,961,363 issued on May 1, 2018, which is a U.S. National Stage Application of International Application No. PCT/KR2012/011619, filed on Dec. 27, 2012, which claims the benefit under 35 USC 119(a) and 365(b) of Korean Patent Application No. 10-2012-0111928, filed on Oct. 9, 2012, in the Korean Intellectual Property Office, the entire disclosures of which are incorporated herein by reference for all purposes.

TECHNICAL FIELD

The present invention generally relates to encoding/decoding of videos and, more particularly, to an inter-layer prediction method and apparatus for a multi-layer video.

BACKGROUND ART

Recently, with the very fast development of wireless networks and the Internet, various multimedia services have been activated. In particular, with the advent of broadcasting communication convergence networks, a standardization task for providing scalability of video encoding has been conducted to guarantee Quality of Service (QoS) under various conditions of an environment in which multimedia is created, transmitted, and consumed, unlike the past in which only compression coding technology was developed.

Scalable Video Coding (SVC) technology is configured to adaptively reconstruct images having different resolutions (spatial), qualities, and frame rates (temporal) from a single compressed bitstream in conformity with various terminals and network environments. SVC is a video codec to which hierarchy is assigned to adaptively cope with various types of multimedia devices at high compressibility of H.264/Advanced Video Coding (AVC), and Joint Video Team (JVT) has carried out standardization of SVC as an amendment of H.264/MPEG-4 PART 10.

Further, High Efficiency Video Coding (HEVC) has been standardized as a next-generation video compression standard technology regarded as having compression efficiency that is more than twice the compression efficiency of the conventional H.264/AVC.

HEVC defines a Coding Unit (CU) having a quadtree structure, a Prediction Unit (PU), and a Transform Unit (TU), and uses an additional in-loop filter such as a Sample Adaptive Offset (SAO) or deblocking filter. Further, existing intra prediction and inter prediction are improved, thus enhancing compression coding efficiency.

Meanwhile, as an extension version of the recently standardized HEVC, SVC has also been standardized.

Conventional SVC technology is problematic in that, in inter-layer prediction, when an enhancement layer having temporal and spatial resolution different from that of a reference layer is encoded, a picture in the enhancement layer, for which a picture in the reference layer cannot be referred to, is present because a reconstructed picture in the reference layer is not present at the same temporal position as that of a picture in the enhancement layer to be encoded.

DISCLOSURE

Technical Problem

An object of the present invention to solve the above-described problems is to provide a method for performing inter-layer prediction by adaptively determining a reference picture upon encoding or decoding a multi-layer video.

Another object of the present invention to solve the above problems is to provide an apparatus for performing inter-layer prediction by adaptively determining a reference picture upon encoding or decoding a multi-layer video.

Technical Solution

In accordance with an aspect of the present invention to accomplish the above objects, there is provided an inter-layer prediction method for a multi-layer video, including generating a reconstructed picture in a reference layer via predictive coding of the reference layer, determining whether a reconstructed picture in the reference layer is present at a time corresponding to a current picture in an enhancement layer, so as to encode or decode the current picture in the enhancement layer, and performing inter-layer prediction with reference to a picture in the enhancement layer or the reconstructed picture in the reference layer.

Performing the inter-layer prediction may include, when the reconstructed picture in the reference layer is not present at the time corresponding to the current picture in the enhancement layer, performing inter-layer prediction with reference to a previous or subsequent picture of the current picture in the enhancement layer.

Performing the inter-layer prediction may include, when the reconstructed picture in the reference layer is not present at the time corresponding to the current picture in the enhancement layer, performing inter-layer prediction with reference to a previous or subsequent picture of the reconstructed picture in the reference layer at the time corresponding to the current picture in the enhancement layer.

Performing the inter-layer prediction may include, when the reconstructed picture in the reference layer is not present at the time corresponding to the current picture in the enhancement layer, performing inter-layer prediction with reference to a previous or subsequent picture of the current picture in the enhancement layer and a previous or subsequent picture of the reconstructed picture in the reference layer at the time corresponding to the current picture in the enhancement layer.

Performing the inter-layer prediction may include, when the reconstructed picture in the reference layer is present at the time corresponding to the current picture in the enhancement layer, performing inter-layer prediction with reference to the reconstructed picture in the reference layer at the time corresponding to the current picture in the enhancement layer.

In accordance with another aspect of the present invention to accomplish the above objects, there is provided an inter-layer prediction apparatus for a multi-layer video, including a frame buffer for storing a reconstructed picture in a reference layer, generated via predictive coding of the reference layer, and a prediction unit for performing inter-layer prediction with reference to a picture in the enhancement layer or the reconstructed picture in the reference layer so as to encode or decode a current picture in the enhancement layer.

The inter-layer prediction apparatus may further include an interpolation unit for interpolating the reconstructed picture in the reference layer in conformity with resolution of the enhancement layer.

Advantageous Effects

When the inter-layer prediction method and apparatus for a multi-layer video according to embodiments of the present invention are used, a picture in an enhancement layer or a picture in a reference layer is adaptively used even when a reconstructed picture in the reference layer is not present at the same temporal position as that of the enhancement layer, thus performing effective inter-layer prediction.

Further, by means of inter-layer prediction in which a picture in an enhancement layer or a picture in a reference layer is adaptively used, encoding and decoding efficiency may be enhanced.

DESCRIPTION OF DRAWINGS

FIG. 1 is a block diagram showing an encoding apparatus for performing inter-layer prediction for a multi-layer video according to an embodiment of the present invention;

FIG. 2 is a conceptual diagram showing an inter-layer prediction method for a multi-layer video according to an embodiment of the present invention;

FIG. 3 is a diagram showing a reference picture list based on the inter-layer prediction method for a multi-layer video according to an embodiment of the present invention;

FIG. 4 is a conceptual diagram showing an inter-layer prediction method for a multi-layer video according to another embodiment of the present invention;

FIG. 5 is a diagram showing a reference picture list based on the inter-layer prediction method for a multi-layer video according to another embodiment of the present invention;

FIG. 6 is a conceptual diagram showing an inter-layer prediction method for a multi-layer video according to a further embodiment of the present invention;

FIG. 7 is a diagram showing a reference picture list based on the inter-layer prediction method for a multi-layer video according to a further embodiment of the present invention;

FIG. 8 is a flowchart showing an inter-layer prediction method for a multi-layer video according to an embodiment of the present invention;

FIG. 9 is diagram illustrating syntax elements used in inter-layer prediction for a multi-layer video according to an embodiment of the present invention; and FIG. 10 is a block diagram showing a decoding apparatus for performing inter-layer prediction for a multi-layer video according to an embodiment of the present invention.

BEST MODE

The present invention may be variously changed and may have various embodiments, and specific embodiments will be described in detail below with reference to the attached drawings. However, it should be understood that those embodiments are not intended to limit the present invention to specific disclosure forms and they include all changes, equivalents or substitutions included in the spirit and scope of the present invention. In the following description of the drawings, the same reference numerals are used to designate the same or similar elements.

The terms such as "first", "second", "A", and "B" may be used to describe various components, but those components should not be limited by the terms. The terms are merely used to distinguish one component from other components. For example, a first component may be designated as a second component and a second component may be designated as a first component in the similar manner, without departing from the scope based on the scope of the present invention. The term "and/or" includes a combination of multiple relevant described items or any of multiple relevant described items.

Throughout the entire specification, it should be understood that a representation indicating that a first component is "connected" or "coupled" to a second component may include the case where the first component is connected or coupled to the second component with some other component interposed therebetween, as well as the case where the first component is directly connected or coupled to the second component. In contrast, it should be understood that a representation indicating that a first component is "directly connected" or "directly coupled" to a second component means that no component is interposed between the first and second components.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Hereinafter, a video encoding apparatus and a video decoding apparatus, which will be described later, may be any of a user terminal such as a Personal Computer (PC), a notebook computer, a personal digital assistant (PDA), a Portable Multimedia Player (PMP), a PlayStation Portable (PSP), a wireless communication terminal, a smart phone or various similar types of devices, a server terminal such as a TV application server or a service server, or any of various types of devices including a communication device, for example, a communication modem for performing communication over a wired/wireless communication network, memory for storing various types of programs and data required to encode or decode an image or to perform inter-image or intra-image prediction for encoding or decoding, a microprocessor for executing programs and performing operations and control, etc.

Further, an image encoded in a bit stream by the video encoding apparatus is transmitted in real time or in non-real time to the video decoding apparatus over a wired/wireless communication network, such as the Internet, a short-range wireless communication network, a Wireless Local Area Network (WLAN), a Wibro network, or a mobile communication network, or through various communication interfaces such as a cable or a Universal Serial Bus (USB), so that the encoded image may be decoded by the video decoding apparatus and may be reconstructed into and played as an original image.

Typically, a video may be composed of a series of pictures, and each picture may be divided into predetermined regions such as frames or blocks. When an area of a picture is divided into blocks, the divided blocks may be chiefly classified into an intra block and an inter block according to a coding method. An intra block denotes a block encoded using intra prediction coding. Here, intra prediction coding denotes a scheme in which a predicted block is generated by predicting pixels in a current block using pixels in blocks, which have been previously encoded and decoded and then reconstructed, in a current picture that is currently encoded, and in which differences between pixel values in the predicted block and in the current block are encoded. Further, an inter block denotes a block encoded using inter prediction coding. Here, inter prediction coding denotes a scheme in which a predicted block is generated by predicting a current block in a current picture with reference to one or more previous or subsequent pictures, and in which differences between pixel values in the predicted block and the current block are encoded. In this case, a frame referred to upon encoding or decoding the current picture is called a reference frame. Further, those skilled in the art to which the present embodiment pertains will appreciate that the term "picture" described below may be replaced with and used with another term, such as an image or a frame, having the same meaning as the picture. Furthermore, those skilled in the art to which the present embodiment pertains will appreciate that a picture referred to in the present invention means a reconstructed picture.

Hereinafter, preferred embodiments of the present invention will be described in detail with reference to the attached drawings.

FIG. 1 is a block diagram showing an encoding apparatus for performing inter-layer prediction for a multi-layer video according to an embodiment of the present invention.

Referring to FIG. 1, the apparatus for performing inter-layer prediction for a multi-layer video according to the embodiment of the present invention may include an encoding apparatus 100 for a reference layer and an encoding apparatus 200 for an enhancement layer. Further, the inter-layer prediction apparatus may include a multiplexer 320 and an interpolation unit 310.

Each encoding apparatus 100 or 200 includes a subtraction unit 110 or 210, a transform unit 120 or 220, a quantization unit 130 or 230, an inverse quantization unit 131 or 231, an inverse transform unit 121 or 221, an entropy encoding unit 140 or 240, an addition unit 150 or 250, an in-loop filter unit 160 or 260, a frame memory 170 or 270, an intra-prediction unit 180 or 280, and a motion compensation unit 190 or 290.

The subtraction unit 110 or 210 subtracts a predicted image generated via intra prediction or inter prediction from an encoding target image (current image) that is a provided input image, and then generates a residual image between the current image and the predicted image.

The transform unit 120 or 220 functions to transform the residual image generated by the subtraction unit 110 or 210 from a spatial domain into a frequency domain. Here, the transform unit 120 or 220 may transform the residual image into a frequency domain using a technique, such as a Hadamard transform, a discrete cosine transform, or a discrete sine transform, for transforming an image signal on a spatial axis into a frequency axis.

The quantization unit 130 or 230 performs quantization on the transformed data (frequency coefficients) provided by the transform unit 120 or 220. That is, the quantization unit 130 or 230 approximates the frequency coefficients that are pieces of data transformed by the transform unit 120 or 220 by dividing the frequency coefficients by a quantization step-size, thus calculating quantization result values.

The entropy encoding unit 140 or 240 generates a bit stream by entropy-encoding the quantization result values calculated by the quantization unit 130 or 230. Further, the entropy encoding unit 140 or 240 may entropy-encode the quantization result values calculated by the quantization unit 130 or 230 using a Context-Adaptive Variable Length Coding (CAVLC) or Context-Adaptive Binary Arithmetic Coding (CABAC) technique, and may also entropy-encode information required to decode an image, in addition to the quantization result values.

The inverse quantization unit 131 or 231 inverse-quantizes the quantization result values calculated by the quantization unit 130 or 230. That is, the inverse quantization unit 131 or 231 reconstructs values in the frequency domain (frequency coefficients) from the quantization result values.

The inverse transform unit 121 or 221 reconstructs the residual image by transforming the frequency domain values (frequency coefficients) provided by the inverse quantization unit 131 or 231 from the frequency domain into the spatial domain. The addition unit 150 or 250 generates a reconstructed image of the input image by adding the residual image, reconstructed by the inverse transform unit 121 or 221, to the predicted image generated via intra prediction or inter prediction, and then stores the reconstructed image in the frame memory 170 or 270.

The frame memory 170 may store a reconstructed picture in the reference layer, which is generated via predictive coding of the reference layer. Further, the frame memory 270 may store a reconstructed picture in the enhancement layer, which is generated via predictive coding of the enhancement layer, and may store a reconstructed picture in the reference layer or an interpolated picture of the reconstructed picture in the reference layer.

The prediction unit may include the intra-prediction unit 180 or 280 and the motion compensation unit 190 or 290 and then perform intra prediction and inter prediction.

The intra prediction unit 180 or 280 performs intra prediction, and the motion compensation unit 190 or 290 compensates for motion vectors for inter prediction.

The prediction unit according to the embodiment of the present invention may perform inter-layer prediction with reference to a picture in the enhancement layer or a reconstructed picture in the reference layer to encode the current picture in the enhancement layer. Here, inter-layer prediction may mean that intra prediction or inter prediction is performed with reference to the reconstructed picture in the reference layer, upon encoding or decoding the enhancement layer.

First, when there is a reconstructed picture in the reference layer at the temporal position corresponding to the current picture in the enhancement layer, the prediction unit may perform inter-layer prediction with reference to the reconstructed picture in the reference layer at the time (temporal position) corresponding to the current picture in the enhancement layer.

In particular, when the reconstructed picture in the reference layer at the time corresponding to the current picture in the enhancement layer is not present, the prediction unit may perform inter-layer prediction with reference to a previous or subsequent picture of the current picture in the enhancement layer.

Further, when the reconstructed picture in the reference layer at the time corresponding to the current picture in the enhancement layer is not present, the prediction unit may perform inter-layer prediction with reference to a previous or subsequent picture of the reconstructed picture in the reference layer at the time corresponding to the current picture in the enhancement layer.

Furthermore, when the reconstructed picture in the reference layer at the time corresponding to the current picture in the enhancement layer is not present, the prediction unit may perform inter-layer prediction with reference to a previous or subsequent picture of the current picture in the enhancement layer and a previous or subsequent picture of the reconstructed picture in the reference layer at the time corresponding to the current picture in the enhancement layer.

The in-loop filter unit 160 or 260, which performs filtering on the reconstructed image, may include a Deblocking Filter (DF), a Sample Adaptive Offset (SAO) filter, and an Adaptive Loop Filter (ALF).

The interpolation unit 310 interpolates the reconstructed picture in the reference layer. That is, the interpolation unit 310 may interpolate the reconstructed picture in the reference layer in conformity with the spatial resolution of the enhancement layer.

The multiplexer 320 receives encoded bit streams from the reference layer and the enhancement layer, and outputs the encoded bit streams.

FIG. 2 is a conceptual diagram showing the inter-layer prediction method for a multi-layer video according to an embodiment of the present invention.

Referring to FIG. 2, pictures in an enhancement layer may be represented by $I_{E0}$ 20, $I_{E1}$ 21, $I_{E2}$ 22, $I_{E3}$ 23, $I_{E4}$ 24, etc. Further, reconstructed pictures in the enhancement layer may be represented by $I_{B0}$ 25, $I_{B2}$ 26, $I_{B4}$ 27, etc.

At the times corresponding to the pictures in the enhancement layer, that is, $I_{E0}$ 20, $I_{E2}$ 22, and $I_{E4}$ 24, reconstructed pictures in the reference layer, that is, $I_{B0}$ 25, $I_{B2}$ 26, and $I_{B4}$ 27, are present. However, reconstructed pictures in the reference layer may not be present at the times corresponding to the pictures in the enhancement layer, that is, $I_{E1}$ 21 and $I_{E3}$ 23.

That is, when a reconstructed picture in the reference layer is present at the time corresponding to the current picture of the enhancement layer, the current picture in the enhancement layer may be encoded or decoded with reference to the corresponding reconstructed picture in the reference layer. Here, the current picture may denote a target picture to be encoded or decoded.

For example, when a current picture in the enhancement layer is $I_{E0}$ 21, $I_{E2}$ 22 or $I_{E4}$ 24, the current picture $I_{E0}$ 21, $I_{E2}$ 22 or $I_{E4}$ 24 may be encoded or decoded with reference to the reconstructed picture in the reference layer, that is, $I_{B0}$ 25, $I_{B2}$ 26, or $I_{B4}$ 27, respectively.

However, when the reconstructed picture in the reference layer at the time corresponding to the current picture in the enhancement layer is not present, the current picture in the enhancement layer may be encoded or decoded with reference to a previous or subsequent picture of the current picture in the enhancement layer.

For example, when the current layer in the enhancement layer is $I_{E1}$ 21, the current picture $I_{E1}$ 21 may be encoded or decoded with reference to $I_{E0}$ 20 or $I_{E2}$ 22.

Further, when the current picture in the enhancement layer is $I_{E3}$ 23, the current picture $I_{E3}$ 23 may be encoded or decoded with reference to $I_{E2}$ 22 or $I_{E4}$ 24.

That is, in accordance with an embodiment of the present invention, a current picture in the enhancement layer may be encoded or decoded with reference to a picture in the same layer (enhancement layer) to support temporal scalability.

FIG. 3 is a diagram showing a reference picture list based on the inter-layer prediction method for a multi-layer video according to an embodiment of the present invention.

Referring to FIG. 3, when a reconstructed picture in the reference layer at the time corresponding to the current picture in the enhancement layer is not present, a reference list for the current picture in the enhancement layer may include a previous or subsequent picture of the current picture in the enhancement layer.

For example, when the current picture in the enhancement layer is $I_{E1}$ 21, picture $I_{E0}$ 20 or $I_{E2}$ 22 may be included in the reference list.

FIG. 4 is a conceptual diagram showing an inter-layer prediction method for a multi-layer video according to another embodiment of the present invention.

Referring to FIG. 4, pictures in an enhancement layer may be represented by $I_{E0}$ 40, $I_{E1}$ 41, $I_{E2}$ 42, $I_{E3}$ 43, $I_{E4}$ 44, etc. Further, reconstructed pictures in the enhancement layer may be represented by $I_{B0}$ 45, $I_{B2}$ 46, $I_{B4}$ 47, etc.

Reconstructed pictures in the reference layer, that is, $I_{B0}$ 45, $I_{B2}$ 46, and $I_{B4}$ 47, are present at the times corresponding to pictures in the enhancement layer, that is, $I_{E0}$ 40, $I_{E2}$ 42, and $I_{E4}$ 44. However, reconstructed pictures in the reference layer may not be present at the times corresponding to pictures in the enhancement layer, that is, $I_{E1}$ 41 and $I_{E3}$ 43.

That is, when a reconstructed picture in the reference layer at the time corresponding to the current picture in the enhancement layer is present, the current picture in the enhancement layer may be encoded or decoded with reference to the corresponding reconstructed picture in the reference layer.

For example, when the current picture in the enhancement layer is $I_{E0}$ 40, $I_{E2}$ 42 or $I_{E4}$ 44, the current picture $I_{E0}$ 40, $I_{E2}$ 42 or $I_{E4}$ 44 may be encoded or decoded with reference to the reconstructed picture in the reference layer, that is, $I_{B0}$ 45, $I_{B2}$ 46 or $I_{B4}$ 47, respectively.

However, when the reconstructed picture in the reference layer at the time corresponding to the current picture in the enhancement layer is not present, the current picture may be encoded or decoded with reference to a previous or subsequent picture of the reconstructed picture in the reference layer at the time corresponding to the current picture in the enhancement layer.

For example, when the current picture in the enhancement layer is $I_{E1}$ 41, the current picture $I_{E1}$ 41 may be encoded or decoded with reference to picture $I_{B0}$ 45 or $I_{B2}$ 46.

Also, when the current picture in the enhancement layer is $I_{E3}$ 43, the current picture $I_{E3}$ 43 may be encoded or decoded with reference to picture $I_{B2}$ 46 or $I_{B4}$ 47.

That is, in accordance with an embodiment of the present invention, the current picture in the enhancement layer may be encoded or decoded with reference to a previous or subsequent picture of the reconstructed picture in the reference layer at the time corresponding to the current picture in the enhancement layer to support temporal scalability.

FIG. 5 is a diagram showing a reference picture list based on the inter-layer prediction method for a multi-layer video according to another embodiment of the present invention.

Referring to FIG. 5, when a reconstructed picture in the reference layer at the time corresponding to the current picture in the enhancement layer is not present, the reference list for the current picture in the enhancement layer may include a previous or subsequent picture of the reconstructed picture in the reference layer at the time corresponding to the current picture in the enhancement layer.

For example, when the current picture in the enhancement layer is $I_{E1}$ 41, picture $I_{B0}$ 45 or $I_{B2}$ 46 may be included in the reference list.

FIG. 6 is a conceptual diagram showing an inter-layer prediction method for a multi-layer video according to a further embodiment of the present invention.

Referring to FIG. 6, pictures in an enhancement layer may be represented by $I_{E0}$ 60, $I_{E1}$ 61, $I_{E2}$ 62, $I_{E3}$ 63, $I_{E4}$ 64, etc. Further, reconstructed pictures in the enhancement layer may be represented by $I_{B0}$ 65, $I_{B2}$ 66, $I_{B4}$ 67, etc.

Reconstructed pictures in the reference layer, that is, $I_{B0}$ 65, $I_{B2}$ 66, and $I_{B4}$ 67, are present at the times corresponding to the pictures in the enhancement layer, that is, $I_{E0}$ 60, $I_{E2}$ 62, and $I_{E4}$ 64. However, reconstructed pictures in the reference layer may not be present at the times corresponding to the pictures in the enhancement layer, that is, $I_{E1}$ 61, and $I_{E3}$ 63.

That is, when a reconstructed picture in the reference layer at the time corresponding to the current picture in the enhancement layer is present, the current picture in the enhancement layer may be encoded or decoded with reference to the reconstructed picture in the reference layer.

For example, when the current picture in the enhancement layer is $I_{E0}$ 60, $I_{E2}$ 62, or $I_{E4}$ 64, the current picture $I_{E0}$ 60, $I_{E2}$ 62 or $I_{E4}$ 64 may be encoded or decoded with reference to the reconstructed picture in the reference layer, that is, $I_{B0}$ 65, $I_{B2}$ 66, or $I_{B4}$ 67, respectively.

However, when a reconstructed picture in the reference layer at the time corresponding to the current picture in the enhancement layer is not present, the current picture may be encoded or decoded with reference to a previous or subsequent picture of the current picture in the enhancement layer and a previous or subsequent picture of the reconstructed picture in the reference layer at the time corresponding to the current picture in the enhancement layer.

For example, when the current picture in the enhancement layer is $I_{E1}$ 61, $I_{E1}$ 61 may be encoded or decoded with reference to pictures $I_{E0}$ 60 or $I_{E2}$ 62 and $I_{B0}$ 65 or $I_{B2}$ 66.

Further, when the current picture in the enhancement layer is $I_{E3}$ 63, $I_{E3}$ 63 may be encoded or decoded with reference to pictures $I_{E2}$ 62 or $I_{E4}$ 64 and $I_{B2}$ 66 or $I_{B4}$ 67.

That is, according to an embodiment of the present invention, a current picture in the enhancement layer may be encoded or decoded with reference to a previous or subsequent picture of the current picture in the enhancement layer and a previous or subsequent picture of the reconstructed picture in the reference layer at the time corresponding to the current picture in the enhancement layer so as to support temporal scalability.

FIG. 7 is a diagram showing a reference picture list based on the inter-layer prediction method for a multi-layer video according to a further embodiment of the present invention.

Referring to FIG. 7, when a reconstructed picture in a reference layer at the time corresponding to a current picture in an enhancement layer is not present, the reference picture list may include a previous or subsequent picture of the current picture in the enhancement layer and a previous or subsequent picture of the reconstructed picture in the reference layer at the time corresponding to the current picture in the enhancement layer.

For example, when the current picture in the enhancement layer is $I_{E1}$ 41, picture $I_{E0}$ 60 or $I_{E2}$ 62 and picture $I_{B0}$ 65 or $I_{B2}$ 66 may be included in the reference list.

FIG. 8 is a flowchart showing an inter-layer prediction method for a multi-layer video according to an embodiment of the present invention.

Referring to FIG. 8, a reconstructed picture in a reference layer is generated via predictive coding of the reference layer, and it may be determined whether a reconstructed picture in the reference layer is present at the time corresponding to a current picture in an enhancement layer to encode or decode the current picture in the enhancement layer.

Further, inter-layer prediction may be performed with reference to a picture in the enhancement layer or a reconstructed picture in the reference layer.

First, when a reconstructed picture in the reference layer at the time corresponding to the current picture in the enhancement layer is present, inter-layer prediction may be performed on the current picture in the enhancement layer using the reconstructed picture in the reference layer present at the time corresponding to the current picture in the enhancement layer.

Meanwhile, when the reconstructed picture in the reference layer at the time corresponding to the current picture in the enhancement layer is not present, inter-layer prediction may be performed with reference to a previous or subsequent picture of the current picture in the enhancement layer.

Further, when the reconstructed picture in the reference layer at the time corresponding to the current picture in the enhancement layer is not present, inter-layer prediction may be performed with reference to a previous or subsequent picture of the reconstructed picture in the reference layer at the time corresponding to the current picture in the enhancement layer.

Furthermore, when the reconstructed picture in the reference layer at the time corresponding to the current picture in the enhancement layer is not present, inter-layer prediction may be performed with reference to a previous or subsequent picture of the current picture in the enhancement layer and a previous or subsequent picture of the reconstructed picture in the reference layer at the time corresponding to the current picture in the enhancement layer.

For example, it may be determined whether are constructed picture in the reference layer is present at the time corresponding to the current picture in the enhancement layer (S810). That is, it may be determined whether a reconstructed picture in the reference layer is present at the same temporal position as that of the current picture in the enhancement layer.

When it is determined that the reconstructed picture in the reference layer is present at the time corresponding to the current picture in the enhancement layer, inter-layer prediction may be performed using the reconstructed picture in the reference layer at the time corresponding to the current picture in the enhancement layer (S820).

When it is determined that the reconstructed picture in the reference layer is not present at the time corresponding to the current picture in the enhancement layer, inter_layer_pred_ext_enable_flag that is a syntax element indicating whether to use a picture at the time differing from that of the current picture in the enhancement layer as a reference picture is decoded.

It may be determined whether inter_layer_pred_ext_enable_flag=1 is satisfied (S830). When inter_layer_pred_ext_enable_flag=1 is not satisfied, intra prediction may be performed on the current picture in the enhancement layer (S840).

When inter_layer_pred_ext_enable_flag=1 is satisfied, it may be determined which picture is to be used to perform inter-layer prediction depending on the value of a syntax element inter_layer_pred_ext_mode.

It may be individually determined whether the value of inter_layer_pred_ext_mode is 0 or 1 (S850, S870).

When inter_layer_pred_ext_mode=0 is satisfied, inter-layer prediction may be performed with reference to a previous or subsequent picture of the current picture in the enhancement layer (S860). That is, intra prediction or inter prediction may be performed using a reconstructed picture in the same layer.

When inter_layer_pred_ext_mode=1 is satisfied, inter-layer prediction may be performed with reference to a previous or subsequent picture of the reconstructed picture in the reference layer at the time corresponding to the current picture in the enhancement layer (S880).

When inter_layer_pred_ext_mode=1 is not satisfied (when inter_layer_pred_ext_mode=2), inter-layer prediction may be performed with reference to a previous or subsequent picture of the current picture in the enhancement layer and a previous or subsequent picture of the reconstructed picture in the reference layer at the time corresponding to the current picture in the enhancement layer (S890).

FIG. 9 is a diagram illustrating syntax elements used in inter-layer prediction for a multi-layer video according to an embodiment of the present invention.

Referring to FIG. 9, it is possible to determine whether to use a picture at a different time as a reference picture by using inter_layer_pred_ext_enable_flag that is a syntax element according to an embodiment of the present invention, and also determine which picture is to be used as a reference picture by using inter_layer_pred_ext_mode.

FIG. 10 is a block diagram showing a decoding apparatus for performing inter-layer prediction for a multi-layer video according to an embodiment of the present invention.

Referring to FIG. 10, a decoding apparatus according to an embodiment of the present invention includes a decoding apparatus 400 for a reference layer and an encoding apparatus 500 for an enhancement layer. Further, the decoding apparatus includes an interpolation unit 610.

Each decoding apparatus 400 or 500 includes an entropy decoding unit 410 or 510, an inverse quantization unit 420 or 520, an inverse transform unit 430 or 530, an addition unit 440 or 540, an in-loop filter unit 450 or 550, a frame memory 460 or 560, an intra-prediction unit 470 or 570, and a motion compensation unit 480 or 580. Components of the decoding apparatus 400 or 500 may be understood to respectively correspond to those of the encoding apparatus of FIG. 1, and thus a detailed description thereof will be omitted.

The prediction unit may include the intra-prediction unit 470 or 570 and the motion compensation unit 480 or 580 to perform intra prediction and inter prediction.

The prediction unit of the decoding apparatus according to the embodiment of the present invention may perform inter-layer prediction with reference to a picture in an enhancement layer or a reconstructed picture in a reference layer so as to encode a current picture in the enhancement layer.

First, when a reconstructed picture in the reference layer at the time corresponding to the current picture in the enhancement layer is present, the prediction unit may perform inter-layer prediction with reference to the reconstructed picture in the reference layer at the time corresponding to the current picture in the enhancement layer.

In particular, when the reconstructed picture in the reference layer at the time corresponding to the current picture in the enhancement layer is not present, the prediction unit may perform inter-layer prediction with reference to a previous or subsequent picture of the current picture in the enhancement layer.

Further, when the reconstructed picture in the reference layer at the time corresponding to the current picture in the enhancement layer is not present, the prediction unit may perform inter-layer prediction with reference to a previous or subsequent picture of the reconstructed picture in the reference layer at the time corresponding to the current picture in the enhancement layer.

Furthermore, when the reconstructed picture in the reference layer at the time corresponding to the current picture in the enhancement layer is not present, the prediction unit may perform inter-layer prediction with reference to a previous or subsequent picture of the current picture in the enhancement layer and a previous or subsequent picture of the reconstructed picture in the reference layer at the time corresponding to the current picture in the enhancement layer.

The inter-layer prediction method and apparatus for a multi-layer video according to the embodiments of the present invention may effectively perform inter-layer prediction by adaptively utilizing a picture in an enhancement layer or a picture in a reference layer even when are constructed picture in the reference layer is not present at the same temporal position as a current picture upon encoding or decoding the enhancement layer, thus improving encoding efficiency via effective inter-layer prediction.

Further, although the individual components of the above-described encoding apparatus and decoding apparatus according to the embodiments of the present invention have been described as being separately listed and included as respective components for convenience of description, a scheme may be implemented in which at least two of the respective components are combined into a single component, or in which a single component is divided into a plurality of components and functions are performed by those components alone or in combination. Those embodiments in which individual components are combined or separated may also be included in the scope of the present invention without departing from the essential features of the present invention.

Also, the encoding apparatus and the decoding apparatus according to the present invention may be stored in a computer-readable storage medium and may be implemented in a computer-readable program or code. The computer-readable storage medium includes all types of recording devices in which data readable by a computer system is stored. Further, the computer-readable storage medium may be distributed across computer systems connected over a network and the computer-readable program or code may be stored and executed in a distributed manner.

Although the present invention has been described with reference to preferred embodiments of the present invention, those skilled in the art will appreciate that the present invention may be changed or modified in various manners without departing from the spirit and scope of the invention as disclosed in the accompanying claims.

What is claimed is:

1. An inter-layer prediction apparatus for a multi-layer video, comprising:
   a frame buffer configured to store a reconstructed picture in an enhancement layer and a reconstructed picture in a reference layer;
   a predictor configured to
   determine whether the reconstructed picture in the reference layer is present at a time corresponding to a current picture in the enhancement layer,
   determine an inter-layer reference picture for the current picture, in response to the determination that the reconstructed picture is present at the time corresponding to the current picture,
   generate a reference picture list for the current picture including the inter-layer reference picture and the reconstructed picture in the enhancement layer, and
   generate a predicted picture of the current picture by performing inter prediction on the current picture based on the reference picture list; and
   an adder configured to generate a reconstructed picture of the current picture by adding the predicted picture of the current picture and a residual picture of the current picture.

2. The inter-layer prediction apparatus of claim 1, wherein the predictor is configured to, when the reconstructed picture in the reference layer is not present at the time corresponding to the current picture in the enhancement layer, perform the inter prediction with reference to a previous or subsequent picture of the current picture in the enhancement layer.

* * * * *